(12) United States Patent
Robison

(10) Patent No.: US 6,371,531 B1
(45) Date of Patent: Apr. 16, 2002

(54) STAB-TYPE COUPLING WITH COLLET HAVING LOCKING RIBS AND ROTATION PREVENTION MEMBER

(75) Inventor: Dave Robison, Madison, OH (US)

(73) Assignee: Perfection Corporation, Madison, OH (US)

( * ) Notice: Subject to any disclaimer, the term of this patent is extended or adjusted under 35 U.S.C. 154(b) by 0 days.

(21) Appl. No.: 09/319,145

(22) PCT Filed: Jan. 13, 1998

(86) PCT No.: PCT/US98/00630

§ 371 Date: May 28, 1999

§ 102(e) Date: May 28, 1999

(87) PCT Pub. No.: WO98/30825

PCT Pub. Date: Jul. 16, 1998

Related U.S. Application Data

(60) Provisional application No. 60/035,480, filed on Jan. 13, 1997.

(51) Int. Cl.[7] .................................................. F16L 17/02
(52) U.S. Cl. ....................... 285/342; 285/105; 285/323
(58) Field of Search .................................. 285/104, 105, 285/342, 343, 323, 249, 382, 382.2, 382.7

(56) References Cited

U.S. PATENT DOCUMENTS

| | | | | |
|---|---|---|---|---|
| 2,755,109 A | * | 7/1956 | Risley | 285/343 |
| 3,815,940 A | * | 6/1974 | Luckenbill | 285/105 |
| 4,025,093 A | * | 5/1977 | Leczycki | 285/343 |
| 4,229,025 A | | 10/1980 | Volgstadt et al. | |
| 4,282,175 A | * | 8/1981 | Volgstadt et al. | 285/105 |
| 4,323,727 A | * | 4/1982 | Berg | 174/135 |
| 4,407,526 A | * | 10/1983 | Cicenas | 285/323 |
| 4,416,472 A | | 11/1983 | Fowler et al. | |
| 4,482,170 A | * | 11/1984 | Jacobson et al. | 285/105 |
| 4,712,811 A | * | 12/1987 | Wier | 285/342 |
| 4,832,379 A | * | 5/1989 | Smith et al. | 285/343 |
| 4,886,304 A | * | 12/1989 | Kunsman | 285/104 |
| 5,080,406 A | * | 1/1992 | Hyatt et al. | 285/382.2 |
| 5,195,757 A | * | 3/1993 | Dahll | 277/134 |
| 5,947,532 A | * | 9/1999 | Lorenz | 285/321 |
| 6,158,743 A | * | 12/2000 | Anerson et al. | 277/373 |

* cited by examiner

Primary Examiner—Eric K. Nicholson
(74) Attorney, Agent, or Firm—Fay, Sharpe, Fagan, Minnich & McKee, LLP

(57) ABSTRACT

A coupling receives a non-metallic tube (12) in an opening of a coupling body (10). A seal assembly (22, 24) disposed inside the coupling body (10) seals between the body (10) and the tube (12). A collet (16) disposed in the coupling body (10) includes a tapered external surface (50) that engages a tapered wall in the coupling body (10) to resist pull-out of the tube (12). The collet (16) includes an inner toothed (52) surface for gripping the tube (12) and has a split (70) or slots (54) that allow the collet (16) to radially expand and contract. A rotation prevention member, which in a preferred embodiment is a longitudinal rib (56) extending inwardly from the collet (16), limits relative rotation between the collet (16) and the tube (12). Moreover, edges (74) of the split (70) are rounded so that the collet can rotate relative to the coupling body (10).

20 Claims, 2 Drawing Sheets

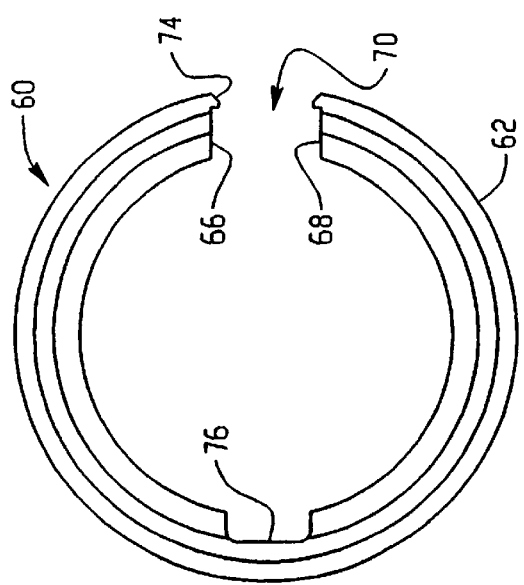
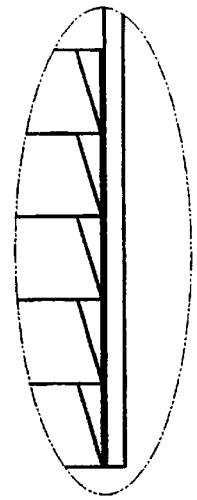
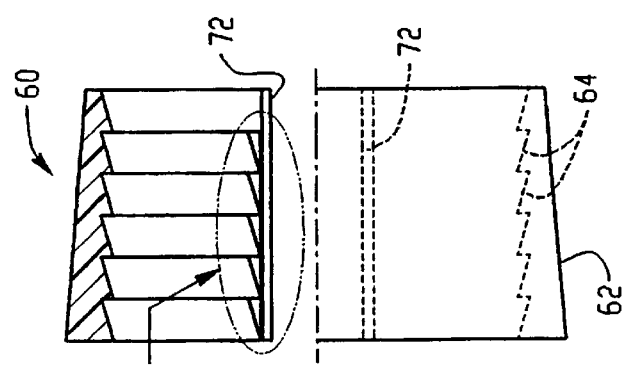
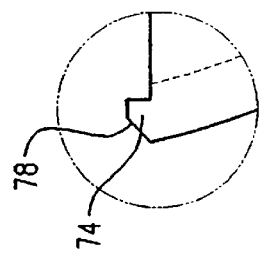
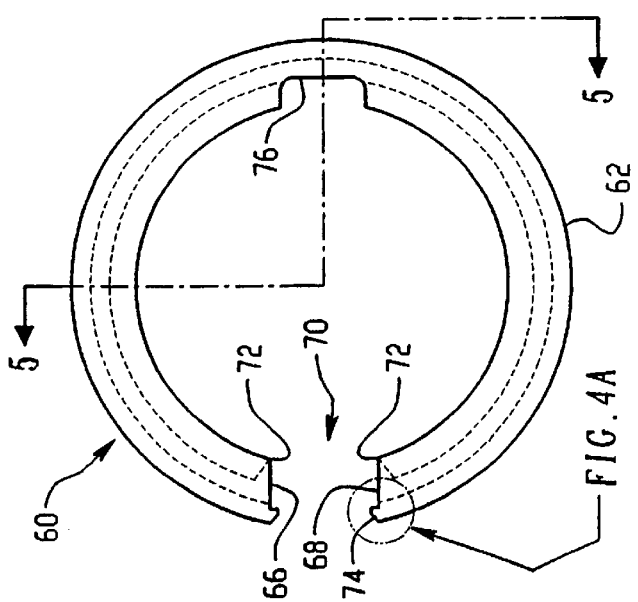

STAB-TYPE COUPLING WITH COLLET HAVING LOCKING RIBS AND ROTATION PREVENTION MEMBER

This application claims priority from provisional patent application Serial No. 60/035,480, filed Jan. 13, 1997.

BACKGROUND OF THE INVENTION

Stab-type couplings for connecting smooth walled non-metallic pipes are known, for example, in U.S. Pat. No. 4,229,025 which is incorporated herein by reference.

These couplings are particularly useful for connecting lengths of plastic pipe, such as plastic pipe used in transmission of natural gas. These stab-type couplings include a tapered, non-metallic coupling body surrounding a coupler assemble which receives the end of a plastic pipe. The coupler assembly inside the coupling body includes a hollow insert tube which fits inside the end of the pipe and a retaining collet which grips an exterior surface of the pipe. The collet is a generally tapered member having a series of circumferential interior teeth for gripping the pipe. The collet also includes a plurality of longitudinally extending recesses which allow the collet to expand and contract as necessary to receive and hold the pipe. The coupler assembly also includes various spacing and sealing members within the coupler body.

The coupler body of the known stab-type coupling is generally attached at one end to another member such as a male or female threaded member, a T-shaped or L-shaped member, or a second coupler body so that a pipe can be coupled to one or more other pipes or other members. A single coupler body of the type disclosed in the '025 patent is shown in FIG. 1. In operation, a free end of a plastic pipe is pushed into the stab-type coupling from the right side of the coupling as shown in the FIGURE. Once the pipe is inserted, the collet prevents the pipe from being removed because attempted pull-out of the pipe will cause the collet to move to the right in the Figure engaging a tapered stainless steel back-up ring which is molded into the interior of the coupling body and causing the sharp interior teeth of the collet to grip the exterior of the pipe. Sealing of the pipe is actually performed by the sealing O-rings provided within the coupling.

The interior teeth of the collet have relatively sharp edges which bite into the pipe and do not allow it to be removed by pulling axially on the pipe. However, the collet having interior circumferential teeth will allow the pipe to be removed or loosened when the pipe is rotated within the collet achieving an unscrewing action.

For example, it has been found that the coupling described in the '025 patent can become unscrewed from the coupling either intentionally or unintentionally by rotating the plastic pipe with respect to the collet and coupling body.

In order to prevent the possibility of unscrewing a plastic pipe from a stab-type coupling, a collet has been designed as shown in the drawings.

SUMMARY OF THE INVENTION

The present invention contemplates a new and improved stab-type coupling that overcomes the above-referenced problems and others and provides a simple, economical solution to these problems.

According to the present invention, there is provided a coupling that receives a non-metallic tube end. The coupling includes a body having an opening at one end that receives the tube end and a seal assembly received in the body that seals between the body and tube end. A collet disposed in the coupling body has an external tapered surface that engages a tapered wall of the coupling body cavity to resist pull-out forces. The collet further includes an inner toothed surface that grips the non-metallic tube end. A rotation prevention member, such as a longitudinal rib, extends inwardly from the collet and prevents relative rotation between the collet and tube.

According to another aspect of the invention, the collet is split by one or more slots that allow the collet to radially expand and contract. Edges of the split may be rounded to allow the collet to rotate relative to the coupling body.

A principal advantage of the invention is the ability to provide a stab-type coupling in which the tube end cannot be rotatably withdrawn.

Still another advantage of the invention resides in the ease with which the solution is accomplished.

Yet another advantage of the invention is associated with the smooth edges that allow the collet to rotate relative to the body.

Still other advantages and benefits of the invention will become apparent to others upon reading and understanding the following detailed description.

BRIEF DESCRIPTION OF THE DRAWING FIGURES

The invention may take physical form in certain parts and arrangements of parts, preferred embodiments of which will be described in detail in this specification and illustrated in the accompanying drawings, wherein:

FIG. 4 is an end view of a second embodiment of a retaining collet;

FIG. 4A is an enlargement of a portion of FIG. 4;

FIG. 5 is a partial cross sectional side view of the retaining collet of FIG. 4, taken along line 5—5;

FIG. 5A is an enlargement of a portion of FIG. 5; and

FIG. 6 is an opposite end view of the collet of FIG. 4.

DESCRIPTION OF THE PREFERRED EMBODIMENTS OF THE INVENTION

Figure 1:
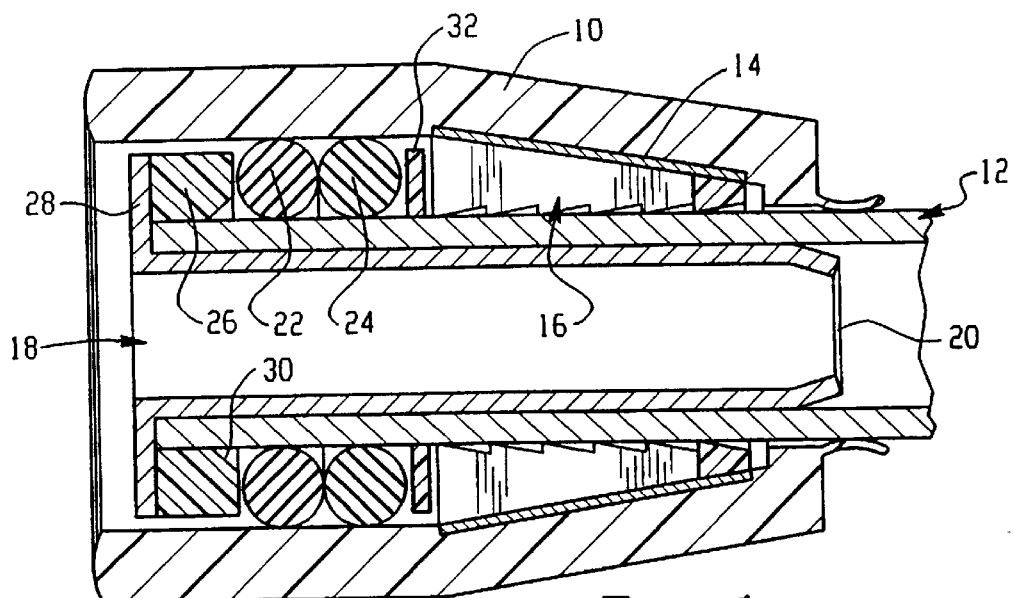
FIG. 1 is a cross sectional side view of a stab type coupling.

Referring now to the drawings, which illustrate preferred embodiments of the invention only and are not intended to limit the invention, the stab-type coupling includes a non-metallic coupling body 10 which receives the end of a non-metallic tube or pipe 12. The interior surface of the coupling body 10 includes a metallic back up ring 14 molded into the coupling body and defining a generally frusto-conical surface which cooperates with a retaining collet 16. A reinforcing stiffener or hollow insert 18 defines an internal passage of the coupling for allowing fluid to pass through the coupling. The hollow insert 18 is preferably chamfered at a first end 20 to assist in inserting the insert into the pipe 12.

Two O-ring seals 22, 24 are provided for sealing between the coupling body 10 and the pipe 12. The O-ring seals 22, 24 are compressed when the pipe 12 is inserted into the coupling body. An annular retainer/spacer ring 26 is positioned adjacent a flange or radial shoulder 28 of the hollow insert 18 to position the O-ring seals 22, 24 and provide support for the flange. In addition, a thrust washer 32 functions to position the O-ring seals 22, 24. The retainer/spacer ring 26 preferably includes interior teeth 30 which grip the exterior of the pipe 12 and cause the O-ring seals 22, 24 and washer 32 to move along with the pipe if the pipe is moved to the right in FIG. 1.

Figure 2:
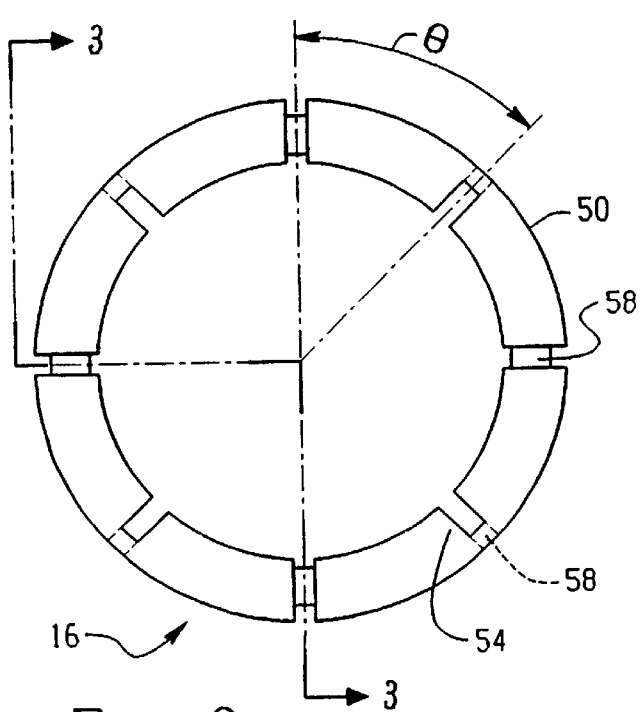
FIG. 2 is an end view of a first embodiment of a retaining collet.
Figure 3:
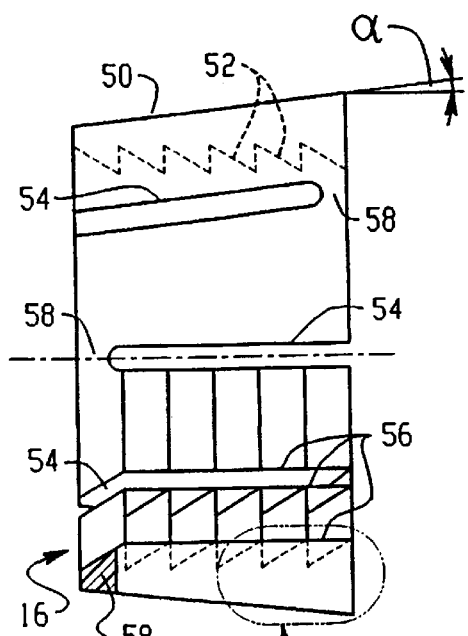
FIG. 3 is a partial cross sectional side view of the retaining collet of FIG. 2, taken along line 3—3.

A first embodiment of a tubular retaining collet 16 which prevents withdrawal of the pipe 12 from the coupling body 10 is shown in FIGS. 2 and 3. As best seen in FIG. 3, the collet 16 is tapered in shape and has a smooth exterior surface 50 and an interior surface having a plurality of circumferential teeth 52. The tapered exterior surface 50 is at an angle α with respect to an axis of the collet. The angle α is generally complementary to the angle of the interior surface of the back-up ring 14 which is molded into the interior surface of the coupling body 10.

The tubular collet 16 is provided with generally longitudinally extending splits defined by recesses or slots 54 located at an angle θ, approximately every 45 degrees, around the collet. The slots 54 permit contraction of the collet about the pipe 12 when an attempt is made to pull the pipe from the coupling. The slots 54 also allow the collet to expand when the pipe 12 is inserted. As shown in FIGS. 1–3, the slots 54 do not extend through the entire length of the collet but open on either the first or the second end of the collet preferably in an alternating manner. Uninterrupted areas 58 are provided on alternating ends of the collet. Different numbers and arrangements of slots 54 may be used without departing from the invention.

Figure 3A:
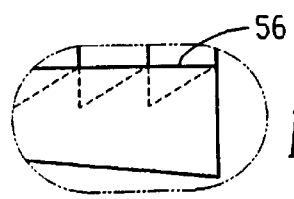
FIG. 3A is an enlargement of a portion of FIG. 3.

In order to prevent the possibility of the plastic pipe 12 being unscrewed from the coupling, the interior surface of the collet 16 has been provided with one or more longitudinal raised ribs 56 extending along one or more edges of the slots 54. As shown in the detail of FIG. 3A the raised rib 56 interrupts the teeth 52. The rib 56 preferably has a height which is substantially equal to the height of the pointed teeth 52. This interruption of the teeth 52 by the ribs 56 will prevent the pipe 12 from rotating with respect to the collet 16 and thus, prevents unscrewing of the pipe from the coupling.

Another embodiment of a collet 60 for use in the stab-type coupling of FIG. 1 for preventing withdrawal of a pipe from the coupling is shown in FIGS. 4–6. The collet 60 is a single split design (i.e., the split extends over the entire longitudinal having an exterior smooth surface 62 and an interior surface having teeth 64. The collet has two edge surfaces 66, 68 formed by the single split 70 which is provided to allow the collet to expand and contract around the pipe. The edge surfaces 66, 68 include a longitudinal rib 72 at the inside diameter of the collet and a longitudinal rounded or chamfered protrusion 74 at the outside diameter of the collet. The ribs 72 interrupt the teeth 64 and prevent the collet 60 from rotating on a pipe. The collet 60 also includes a longitudinal smoothed surface 76 which has no teeth and extends from one end of the collet to an opposite end.

It is desirable that while the collet does not rotate on the pipe, the collet does freely rotate inside the tapered portion of the coupling body 10. Therefore, the longitudinal protrusions 74 formed at each edge of the split 70 have a rounded or chamfered corner 78 shown in FIG. 4A. The purpose and function of this chamfer 78 is to minimize the possibility that the outer corner of the edges 66, 68 of the collet 60 may bite into the internal diameter of the coupling body in a manner which impedes the ability of the collet to rotate along with the pipe. Thus, the chamfered corner 78 prevents the corner from catching on the interior surface of the coupling body.

The invention has been described with reference to the preferred embodiments. Obviously modifications and alterations will occur to others upon reading and understanding this specification. It is intended to include such modifications and alterations insofar as they come within the scope of the appended claims or equivalents thereof. For example, while the embodiments which have been illustrated in the drawings include axial ribs to prevent rotation of the pipe inside the collet, other structures may also be used to perform this function. The collet interior surface may include serrated teeth, nubs on the teeth, randomly tilted teeth, etc. In addition, the locations, number, and shape of the ribs may be varied without departing from the invention.

The coupling including a collet according to the present invention allows reliable, quick, and secure connection of pipes.

The coupling provides a connection which cannot be unscrewed in the manner in which known stab-type couplings can be unscrewed.

Having thus described the invention, it is claimed:

1. A coupling for receiving an end of an associated non-metallic tube, the coupling comprising:
   a coupling body having an opening dimensioned to receive an associated non-metallic tube end and at one end communicating with an internal cavity, the cavity including a tapered wall that converges toward the opening;
   a seal assembly received in the coupling body cavity for sealing between the coupling body and an associated non-metallic tube end;
   a collet received in the coupling body cavity and having a tapered external surface that engages the tapered wall of the cavity to resist pull-out of an associated non-metallic tube end, the collet further including an inner toothed surface for gripping an external surface of an associated non-metallic tube end and a split that allows the collet to radially expand and contract; and
   a circumferentially discontinuous rotation prevention member extending from the collet along a substantial portion of an axial length thereof to limit relative rotation between the collet and an associated non-metallic tube end.

2. The coupling of claim 1 wherein the split extends in a generally longitudinal direction from a first end of the collet and terminates before reaching a second end of the collet.

3. The coupling of claim 2 wherein the split is defined by multiple slots circumferentially spaced about the collet.

4. The coupling of claim 1 wherein the split is defined by multiple slots circumferentially spaced about the collet.

5. The coupling of claim 1 wherein the split extends inwardly from ends of the collet and terminate before reaching an opposite end.

6. The coupling of claim 5 wherein the split is defined by multiple slots that extend generally longitudinally from opposite ends of the collet in an alternating manner.

7. The coupling of claim 1 wherein the rotation prevention member includes a rib extending radially inward from the collet.

8. The coupling of claim 1 wherein the rotation prevention member includes first and second ribs disposed on opposite sides of the split.

9. The coupling of claim 1 wherein the tapered wall of the coupling body includes a metallic back-up ring.

10. The coupling body of claim 1 further comprising a metallic insert sized for receipt in an associated non-metallic tube and including a shoulder that is adapted to abut against an end of an associated non-metallic tube.

11. A stab-type coupling for connecting to an end of a smooth wall non-metallic tube, the coupling comprising:

a coupling body having an opening at a first end adapted to receive an associated non-metallic tube at least one seal member received in the coupling body and dimensioned for sealing between an associated non-metallic tube end and the coupling body;

a retaining collet disposed in the coupling body having a tapered external surface that converges toward the first end and an internal toothed surface adapted to grip an associated non-metallic tube end, the collet including at least one slot allowing the collet to radially expand and contract about an associated non-metallic tube end; and a rotation preventing member between the collet and an associated non-metallic tube end extending only linearly.

12. The coupling of claim 11 wherein the rotation preventing member includes a rib extending radially inward from an edge of the collet adjacent the slot.

13. The coupling of claim 11 wherein the rotation preventing member includes a pair of ribs extending radially inward from either side of the slot.

14. The coupling of claim 11 further comprising smooth edges along the slot that allow free rotation between the collet and the coupling body.

15. The coupling of claim 11 wherein the internal toothed surface includes circumferentially extending teeth and the rotation preventing means includes at least one generally longitudinally extending rib.

16. The coupling of claim 11 further comprising a tapered metallic back-up ring received in the coupling body for operative engagement with the collet.

17. The coupling of claim 11 further comprising a metallic insert dimensioned for receipt in a terminal end of an associated non-metallic tube.

18. The coupling of claim 11 wherein the seal member is axially interposed between a back-up ring and a thrust ring.

19. The coupling of claim 1 further comprising smooth edges along the split that allow free rotation between the collet and the coupling body.

20. A coupling for receiving an end of an associated non-metallic tube, the coupling comprising:

a coupling body having an opening dimensioned to receive an associated non-metallic tube end and at one end communicating with an internal cavity, the cavity including a tapered wall that converges toward the opening;

a seal assembly received in the coupling body cavity for sealing between the coupling body and an associated non-metallic tube end;

a collet received in the coupling body cavity and having a tapered external surface that engages the tapered wall of the cavity to resist pull-out of an associated non-metallic tube end, the collet further including an inner toothed surface for gripping an external surface of an associated non-metallic tube end and a split that allows the collet to radially expand and contract; and a circumferentially discontinuous rotation prevention member extending from the collet to limit relative rotation between the collet and an associated non-metallic tube end.

* * * * *